Patented Aug. 25, 1936

2,052,214

UNITED STATES PATENT OFFICE 2,052,214

DIFFERENTIAL FROTH FLOTATION

Frederic A. Brinker, Denver, Colo.

No Drawing. Application October 9, 1933,
Serial No. 692,825

17 Claims. (Cl. 209—167)

This invention relates to the froth flotation process for the recovery of minerals and has to do particularly with the separation of lead and/or copper sulfides that may contain gold and/or silver from zinc and/or iron sulfides. The principal object of the invention is to provide an economical and efficient method for the removal of lead and/or copper sulfides from ores containing zinc and/or iron sulfides in which a maximum recovery of lead and/or copper is obtained with a minimum amount of zinc and/or iron sulfides.

As is well understood zinc and/or iron sulfides are not desirable minerals in lead or copper concentrate and only dilute these concentrates, thereby increasing the marketing cost of these lead or copper concentrates. This is not the only objectionable feature, but in addition, when the zinc and/or iron sulfides tend to float with the lead and/or copper sulfides, it is impossible normally to add enough reagent for the lead and/or copper sulfides or to float sufficiently long to recover the maximum amount of lead and/or copper without producing a low grade concentrate by reason of dilution with zinc and/or iron sulfides.

I have discovered that a zinc cyanide compound, and preferably the relatively insoluble zinc cyanide, in a non-basic pulp with thiocarbanilid, results in an activating condition for the flotation of lead and/or copper sulfide, and that this condition also results in a non-activating condition for zinc and/or iron sulfides.

The zinc cyanide and the thiocarbanilid may be added together, but on some ores better results are obtained if the zinc cyanide is added prior to the thiocarbanilid so that a length of time is given for the cyanide to react with the ore prior to the addition of the thiocarbanilid. The thiocarbanilid ordinarily should not be added first, because then most of the sulfides will be activated and float in the froth concentrate, a condition which is not desired in differential flotation. As to the zinc cyanide to be used, the insoluble zinc cyanide ($Zn(CN)_2$) is preferable because it has a very limited solvent effect on any copper sulfides present, but the soluble zinc sodium cyanide ($Na_2Zn(CN)_4$) may be used on some ores. Solvent effects of cyanides such as sodium, potassium, calcium and barium cyanides are undesirable because they activate zinc and/or iron sulfides. Zinc cyanide is desirable also for the reason that it is a more effective inhibitor of zinc sulfide than the other cyanides. Another probable reason that zinc cyanides give better results is that zinc cyanides are non-basic, while soluble cyanides such as sodium or potassium are basic.

It is preferable to add the cyanide to the ore as it is fed to the grinding mill and then to add the thiocarbanilid to the ground ore pulp, giving the pulp a short conditioning period prior to its introduction to the flotation machine. Cresylic acid or any other frothing agent then is added to facilitate the removal of the lead and/or copper froth concentrate, and the pulp subjected to a froth flotation operation.

It is important that the ore pulp be non-basic, because an alkaline pulp under the conditions described herein results in a condition where the lead and/or copper sulfides are less floatable and the zinc and/or iron sulfides are more floatable. The pulp may however be acid or slightly acid instead of merely neutral, although a neutral pulp is preferred.

This invention is applicable to ores in which the major value of the ore is gold and/or silver, and in which ore this gold and/or silver is contained in a very small amount of lead sulfide and/or copper sulfide, and in which ore there are also present zinc and/or iron sulfide which are relatively barren of gold and/or silver. In this type of ore the major problem is first the maximum recovery of the gold and/or silver values, with the minor problem of reducing to a minimum the amount of zinc and/or iron sulfides which dilute the concentrates.

A typical example of the invention as applied to this type of ore is as follows: The ore used was primarily a gold ore containing approximately 12 to 15% combined lead, copper, zinc and iron sulfides contained in limestone and quartz gangue. The ore was fed to the grinding mill with 6/100 (0.06) of a pound of zinc cyanide per ton of ore and ground to the necessary fineness to liberate the minerals from each other and from the gangue. The pulp was then introduced into the flotation machine and 3/100 (0.03) of a pound of thiocarbanilid per ton of ore added and the pulp allowed to condition a few minutes. Then enough cresylic acid was added to make the proper froth conditions and a froth concentrate was removed by flotation. The tailings were then run to waste.

Another example of the invention as applied to this type of ore is as follows: The ore used was a gold silver ore containing 1.0% of lead and 1.2% of copper, these lead and copper sulfides containing the gold and silver, together with 10 to 12% combined zinc and iron sulfides in a quartz and limestone gangue. The ore was fed to the grinding mill with 3/100 of a pound of zinc cyanide per ton of ore and 3/100 of a pound of thiocarbanilid per ton of ore, and ground to necessary fineness to liberate the minerals from each other and from gangue. The pulp was then introduced into the flotation machine with enough cresylic acid to give a proper froth and a lead-copper froth concentrate containing gold and silver was removed by flotation. The tailing containing the zinc and iron sulfides was run to waste.

This invention is applicable to most ores in which a differential flotation separation is desired between lead and/or copper sulfides and zinc and/or iron sulfides.

The amounts of cyanide and thiocarbanilid added will be varied according to the ore and conditions in order to effect the desired recovery of the values and the desired percentage of rejection of zinc and/or iron sulfides to meet the best economic conditions of recovery, marketing cost and reagent cost. Also other details of procedure may be varied, but the same general principles above outlined will be used.

In some ores the recovery of copper sulfide may be increased by adding to the flotation pulp a soluble lead compound such as lead nitrate, acetate, chloride, or any other soluble or slightly soluble lead compound to reactivate any copper sulfide inhibited by the cyanide so that such copper sulfide will float off into the froth concentrate. Here the sulfide ores themselves have a reducing effect, and this effect is sufficient to inhibit a small part of the copper sulfides in the presence of the cyanide. A soluble lead compound then serves to reactivate the inhibited portion of the copper sulfide so that it also may be floated. Where a lead compound is used for this purpose some promoter for lead and/or copper sulfides other than thiocarbanilid may be employed if desired, such as the disubstituted dithiophosphate found upon the market as sodium "aerofloat". In some ores of this type there may be an antimony sulfide mineral containing gold and/or silver, and in this case a soluble lead compound such as above mentioned will when added activate this antimony sulfide and cause it to float into the froth concentrate with the lead and/or copper sulfides. (This activation with a lead salt is covered in my copending application Serial No. 666,351 filed October 17, 1934.) The iron and zinc sulfides are not substantially activated by the lead salt, such sulfides remaining in the tailings.

It is to be understood that the above disclosures are merely illustrative of the generic invention herein presented, and that many variations thereof may be made by the skilled operator or engineer without departing from the spirit of the invention as covered by the claims.

I claim:

1. A froth flotation process for the separation of sulfide minerals comprising preparing a non-basic pulp containing sulfides of the group consisting of copper and lead sulfides, and sulfides of a second group consisting of zinc and iron sulfides, supplying a zinc cyanide compound and thiocarbanilid to said pulp, adding a frothing agent, and removing the first group sulfides as a froth concentrate by subjecting the pulp to a froth flotation treatment.

2. A method according to claim 1 wherein the zinc cyanide compound is the largely insoluble zinc cyanide $(Zn(CN)_2)$.

3. A froth flotation process comprising preparing a non-basic pulp containing at least one of the sulfides of the group lead sulfide and copper sulfide and at least one of the group zinc sulfide and iron sulfide, supplying a zinc cyanide compound and thiocarbanilid to the pulp, allowing a period of time for conditioning the pulp, supplying a frothing agent, and subjecting the pulp to a froth flotation treatment to remove a froth concentrate containing the lead and copper present.

4. A process according to claim 3 wherein the zinc cyanide compound is the largely insoluble zinc cyanide compound $(Zn(CN)_2)$.

5. In a froth flotation process for sulfide ores, the steps of supplying a zinc cyanide to a pulp containing at least one of the group lead and copper sulfides and at least one of the group zinc and iron sulfides, allowing a period of time for conditioning of the pulp, adding thiocarbanilid to the conditioned pulp, allowing a period of time for conditioning, adding a frothing agent, and recovering the copper and lead sulfides present by subjecting the conditioned pulp to a froth flotation step.

6. A process according to claim 5 wherein the zinc cyanide is the largely insoluble zinc cyanide $(Zn(CN)_2)$.

7. A froth flotation process comprising preparing an ore pulp containing copper sulfides and sulfides of the group zinc and iron sulfides, supplying a cyanide compound and thiocarbanilid to the pulp, adding a soluble lead salt to the resultant pulp to reactivate inhibited copper sulfides, adding a frothing agent, and subjecting the pulp to a froth flotation operation to remove the copper sulfides and any contained lead sulfides as a froth concentrate.

8. A method according to claim 7 wherein the cyanide is zinc cyanide.

9. A process according to claim 7 wherein the prepared pulp is a non-basic pulp.

10. A process according to claim 7 wherein the prepared pulp is a non-basic pulp and the cyanide is zinc cyanide.

11. A process for froth flotation comprising preparing an ore pulp containing antimony sulfide, sulfide of the group lead and copper sulfide and sulfide of the group zinc and iron sulfide, supplying a cyanide compound and thiocarbanilid to the pulp, adding a soluble lead compound to activate the antimony, adding a frothing agent, and subjecting the pulp to a froth flotation operation to remove the antimony sulfide and the copper and lead sulfide present as a froth concentrate.

12. A process according to claim 11 wherein the prepared pulp is a non-basic pulp.

13. A process according to claim 11 wherein the prepared pulp is a non-basic pulp and the cyanide is zinc cyanide.

14. A process for the froth flotation of sulfide ores comprising preparing an ore pulp containing copper sulfide and sulfide of the class zinc and iron sulfide, supplying a cyanide compound and a promoter for the copper sulfide, adding a soluble lead compound to reactive inhibited copper sulfide, adding a frothing agent, and subjecting the resultant pulp to a froth flotation treatment to remove the copper sulfide in a froth concentrate leaving the contained iron and zinc sulfide in the pulp.

15. A froth flotation process for the separation of sulfide minerals comprising preparing a non-basic pulp containing sulfides of the class including copper and lead sulfides and sulfides of the class including zinc and iron sulfides, supplying zinc cyanide compound and a promoter to said pulp, adding the frothing agent and recovering a froth concentrate containing any lead and copper sulfide present by subjecting the pulp to froth flotation.

16. A process according to claim 15 wherein the cyanide is $Zn(Cn)_2$.

17. A process according to claim 15 wherein the cyanide is $Zn(CN)_2$ and the promoter is thiocarbanilid.

FREDERIC A. BRINKER.